Figure 1:
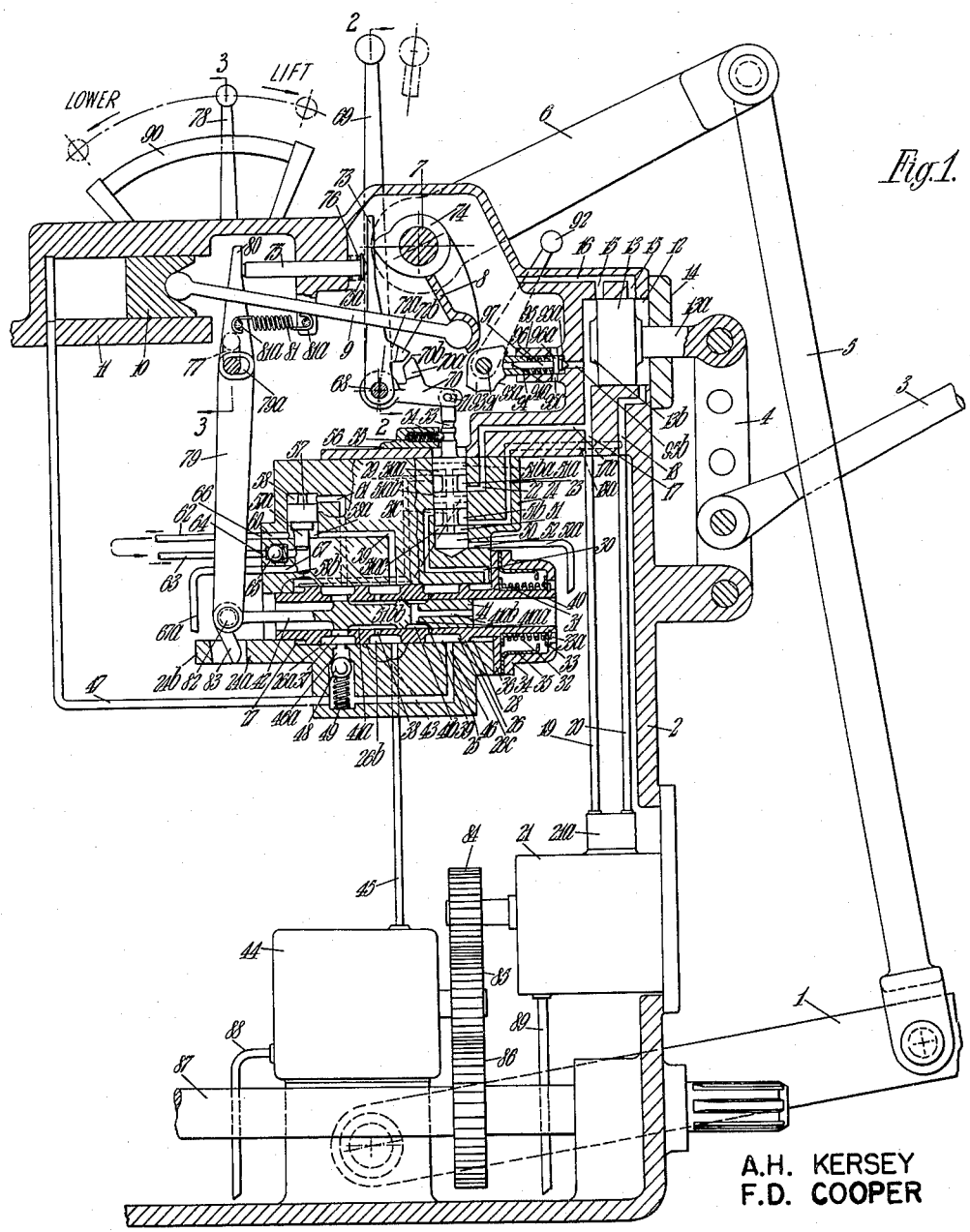

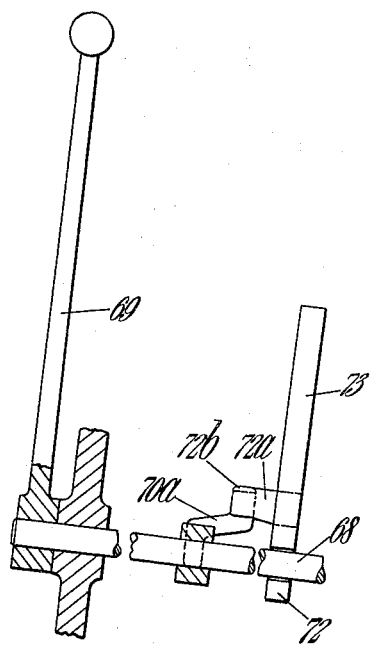

United States Patent Office 3,002,571
Patented Oct. 3, 1961

3,002,571
HYDRAULIC SYSTEM FOR TRACTORS
Albert Henry Kersey, Castle Bromwich, near Birmingham, and Frederick D. Cooper, Coventry, England, assignors to Ford Motor Company, Dearborn, Mich.
Filed Oct. 22, 1957, Ser. No. 691,697
Claims priority, application Great Britain June 21, 1957
5 Claims. (Cl. 172—9)

This invention relates to automatic depth control arrangement for tractor mounted implements and has particular reference to tractor hydraulic systems of the type employing a constantly operating fluid pump, wherein pump output fluid is either bypassed to a sump or directed to a lifting ram or other work-producing mechanism and wherein fluid from the work-producing mechanisms is discharged to that sump, and one in which a draft or automatic depth control condition is obtained when a valve operable by the draft forces on the implement is arranged to connect the pump to the implement lifting ram upon an increase of said forces and to permit the implement to lower when the said forces are reduced to a predetermined amount. In known mechanism of this type an alternative setting of the control allows a height or positive depth control condition to be obtained when a cam in the lifting mechanism is brought into engagement with the valve so that the lowering operation is stopped and the implement held at a predetermined height in relation to the tractor the control valve being so arranged that such height is not effected by the draft forces on the implement.

The general purpose of this invention is to provide an improved hydraulic system for tractors whereby the condition known as draft or automatic depth control can be achieved by hydraulic actuation of the related control valve in place of the normal mechanical means to facilitate the more convenient disposition of the separate elements of the system and in such an improved system also to make it convenient for the draft forces from working extra heavy implements over-hung beyond the attaching points of the draft linkage to be successfully used to control the depth of working of such implements.

Preferably also such an improved hydraulic system should include the alternative condition known as height or positive depth control characterised by the further ability when using automatic depth control, for such positive depth control condition to be automatically introduced and supersede the automatic depth control condition during the last stages of the implement lifting operation to operate the control valve to ensure that the implement is retained in the fully lifted position especially during periods when the implement is being transported so that the pumping means for lifting is relieved of load.

According to the invention therefore there is provided an automatic depth control arrangement for tractor mounted ground, working implements in which the forces obtained from the working conditions of the implement promote and are balanced by hydraulic pressures upon either one of two alternative streams of fluid passing across the ends of a double acting piston to which said forces are transmitted, the said pressures also actuating a control valve mechanism to cause the depth of working of the implement automatically to be controlled.

The invention may also provide in such an improved hydraulic system an overload release valve of special design to minimise the results of shock loading on implements of varying strength in such a way that adhesion of the tractor driving wheels is reduced so that they are caused to spin and stop the tractor.

Figure 6:
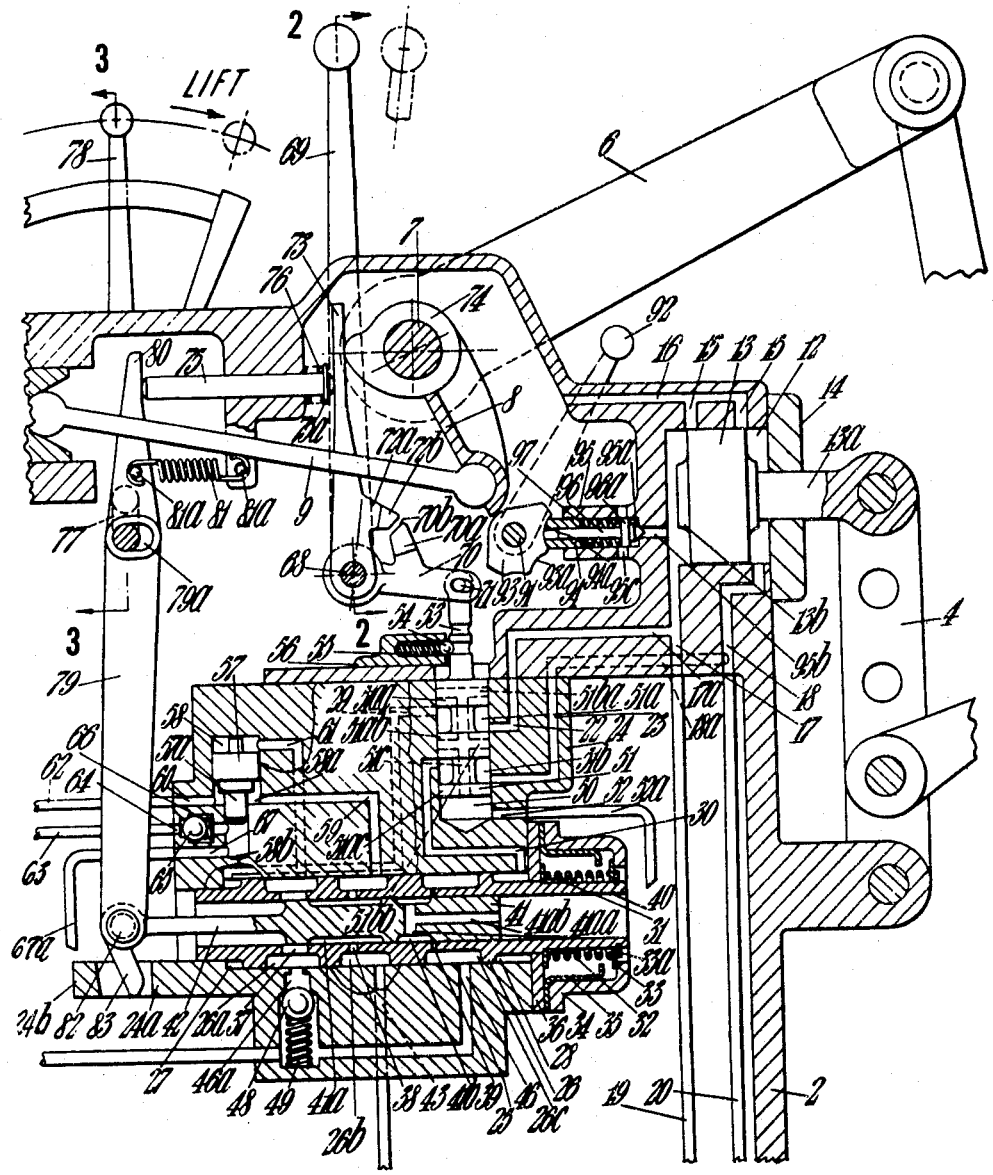

One particular one of many forms of the invention will now be described by way of example with reference to the accompanying drawings, in which:

FIGURE 1 is a diagrammatic layout of the system and incorporates sections through relevant assemblies.
FIGURE 2 is a section through the tractor body on line 2—2 of FIGURE 1.
FIGURE 3 is a section through the tractor body on line 3—3 of FIGURE 1.
FIGURE 4 is a view of one setting of the positive depth control mechanism alternative to that shown in FIGURE 2.
FIGURE 5 is another view similar to FIGURE 4 to show a further alternative setting of the positive depth control mechanism.
FIGURE 6 is an enlarged layout similar to FIGURE 1 of a portion of the system there shown.

Referring to FIGURE 1 which shows a common method by which implements are attached to tractors for the purpose intended, a pair of draft or implement attaching lower links 1 substantially in line with each other in side elevation are, as in common practice, pivotally and universally attached, one at each side, to the tractor body 2 and at their other ends similarly attached to an implement (not shown) for the purpose of connecting the implement to the tractor. A single upper link 3 is similarly connected to the implement at a higher level at its other end and to a link 4 pivotally attached to the said tractor body. Lift rods 5 are also pivotally attached at their lower ends to said draft links and at their upper ends to levers 6, which are rigidly fixed external to the tractor to a cross shaft 7 to which at or near its central part is similarly attached a ram lever 8 usually within the tractor body 2. The end of this ram lever is in the form of a cup to receive the end of a connecting or ram rod 9 whose other end is similarly received in a cup in the reverse side of a piston 10 which is a close but slidable fit in a ram cylinder 11.

Departure from a common practice now lies in the following:

Housed within a bore 12 in the tractor body or associated part is a pressure actuating double acting ram or piston 13 having an extension 13a which passes through an end cover 14 for pivotal attachment to the upper end of link 4. Ports or passages 15 are located in the bore 12 so that they are not entirely covered by the ends of the ram 13 when the latter is in the central position as shown. These ports 15 connect with a common passage 16 which is open to the interior of the tractor body 2. Other passages 17, 18 are located one at each end of the cylinder bore 12 where they are at all times uncovered by the ram 13 regardless of its endwise movement, bosses 13b on the ends of the ram 13 ensuring this state of affairs when the ram is in either of its extreme positions.

Located within the tractor body is a small pump 21 which feeds fluid to a conventional flow bisector 21a so to produce two independent and uniform streams of fluid whose pressures can be completely independent of each other, these two streams being passed by way of pipes 19, 20 to the passages 17, 18. Alternatively two pumps could be used without a flow bisector to produce these two independent uniform streams. The passages 17, 18 are also connected by way of passages 17a, 18a to other passages 22, 23 in a valve body 24 attached to a suitable facing on the tractor body.

Valve body 24 has a stepped throughbore 25 in which a stepped sleeve 26 is a close sliding fit. The maximum diameter part of sleeve 26 has three wide annular grooves 26a, 26b, and 26c and each end of this sleeve adjacent this part is slightly reduced in diameter to provide pressure reaction faces for endwise operation of said sleeve. Thus around the ends of the maximum diameter part of the stepped sleeve 26 there are annular or end spaces 27, 28. Two passages 29, 30 are formed in the valve body for connection to these end spaces. Preferably the sleeve 26 is extended at one end for the provision of means for limiting the endwise movement of said sleeve in either direction such limited means comprising for example, a still further reduced diameter part at the end of the sleeve upon which is a freely slidable flanged sleeve 31 end loaded in a conventional manner for centralising purposes by a spring 32 whose other end rests against a stop plate 33 retained on the sleeve 26 by a conventional circlip or spring ring 33a the stop plate 33 contacting the inner face of an end cover 34 within which is located a stop 35 in the form of a pressed metal cup which together with the end cover 34 is attached to a facing on the valve body a plate 36 being sandwiched between the flange of stop 35 and the facing. End cover 34 has a bore of sufficient size to enable the spring ring 33a but not the stop plate 33 to pass through end cover 34 and stop 35 has a bore to allow free passage for spring 32 only. Plate 36 is bored so as to ensure that the adjacent reduced end of sleeve 26 is a close sliding fit. The spring 32, as is conventional practice, must be appreciably compressed from its free unloaded state and therefore exerts an equal force of some magnitude in both directions upon and thus holds sleeve 26 in the position shown in FIGURES 1 and 6.

The sleeve 26 has crossports 37, 38, 39 of varying sizes which connect the annular grooves 26a, 26b, 26c respectively to a throughbore 40 in the sleeve 26 in which a slidable spool valve 41 is closely fitted. Annular grooves 41a, 41b are formed in the outside diameter of said spool valve and a cross bore 41aa connects groove 41b with a passage 41ab in and open to one end of the spool valve. The other end of spool valve 41 has an extension 42 in which is a hole to facilitate connection to the valve operation linkage.

The valve body 24 also has a passage 43 connecting the pressure side of the master fluid pump 44 by pipe 45 to the centre annular groove 26b in sleeve 26. Another passage 46 in the valve body connects annular groove 26c in sleeve 26 to ram cylinder 11 by way of a pipe 47. Passage 46 is connected to annular groove 26a by a passage 46a which is shaped for a portion of its length to provide a non-return valve seating on which a ball 48 is held by a spring 49.

Integral with the valve body 24 are stops 24a, 24b which act as limit stops for the operating linkage mechanism.

Providing that passages 22 and 23 are considered to be jointed to passages 29 and 30 respectively as if the spool valve chamber 50 was not provided to intercept these passages the foregoing covers all the requirements in the valve body for the special condition commonly known as automatic depth or draft control, whereby the draft forces on the implement are used automatically to control the depth of working of the implement, but to provide the alternative condition whereby the implement can be lowered to a predetermined height in relation to the tractor and prevented from further lowering regardless of the draft of the implement, such condition commonly known as height or positive depth control, a spool valve 51 is provided in valve body 24 in such a position that the relatively continuous passages 22, 29 and 23, 30 are each intercepted and their entries in the spool valve chamber 50 conveniently displaced to enable the said spool valve to be positioned within the said valve chamber to enable the condition of either automatic depth or positive depth control to be selected at will.

This spool valve 51 is a close sliding fit within spool chamber 50 and has two annular grooves 51a, 51b which thereby provide three lands 51aa, 51ab and 51ac for contact with the bore of the spool valve chamber. Lands 51aa, 51ab have cross-ports 51ba, 51bb each connecting to a common centre hole 51c which is open to one end of the spool valve. An exit port 52 at the closed end of spool chamber 50 connects that end of the chamber to the interior of tractor body 2 by way of pipe 52a. There is an extension at one end of the spool valve 51 for connection to the operating linkage and two annular grooves 53 are formed in the shank portion of this extension to form detents for engagement with a ball 54 loaded by a spring 55 contained within a separate housing 56 attached to tractor body 2 through a part of which is a hole for permitting free passage of the spool valve extension.

To enable the hydraulic system to be used for other work-producing mechanisms usually external to the tractor such as single-acting and double-acting-hydraulic rams valve body 24 has a bobbin valve 57 which is a sliding fit within a bobbin valve chamber 58 one end of which is extended as a smaller bore 58b to receive a reduced shank portion 57a of the bobbin valve, endwise movement of which is limited in either direction by end contact with the ends of the bobbin valve chamber 58. The contacting ends of the bobbin valve are reduced in diameter to prevent the bobbin valve covering passages 59, 60 and 61 which are arranged at or near the ends of the said bobbin valve chamber. One end of the bobbin valve chamber is connected by passage 59 to annular groove 26b in sleeve 26 and also by passage 60 to a pipe 62 connected to a convenient point (not shown) exterior to the tractor body to which a control valve for a conventional work producing mechanism can be attached. The other end of the bobbin valve chamber 58 is connected by passage 61 to an annular groove 26a. In conjunction with the foregoing a pipe 63 also connected to a convenient point (not shown) exterior to the said tractor body is connected to a passage 64 in valve body 24 said passage being enlarged to form a chamber to receive and provide a seating for a non-return valve ball 65 loaded on the seating by spring 66. Passage 64 continues to connect this chamber to the reduced bore extension 58b of bobbin valve chamber 58 at a position convenient for the passage to be covered by the reduced shank portion 57a of the bobbin valve when the latter reaches the limit of endwise movement in one direction. The closed end of the reduced bore extension is connected to the interior of the tractor body by passage 67 and pipe 67a.

In practice should other work-producing means not be in use the two pipes 62, 63 can be joined together hydraulically for example at their connecting points exterior to the tractor body so as to provide in effect one pipe from passage 60 to passage 64 as indicated by the direction line in FIGURE 1 and FIGURE 6.

Referring now to FIGURES 1, 2, 4 and 5, a shaft 68 passes through and is supported by the tractor body. Rigidly attached to this shaft are a hand lever 69 outside the tractor body and an operating lever 70 inside the said tractor body, the operating lever having a closed ended slot at its outer end for engagement with a pin 71 by which it is connected to the end of the extension of spool valve 51. Integral with lever 70 is an arm 70a the end of which has a connecting pad 70b. Freely pivoting on shaft 68 is a lever 72 which also has a contacting pad 72b on a short arm 72a the two contacting pads being in line with each other as viewed in FIGURE 2. Lever 72 extends to produce a finger 73 for contact with the nose of a cam 74 rigidly fixed to cross-shaft 7 or alternatively forming part of the boss of ram lever 8.

In contact with the other side of the said finger is a plunger 75 supported by and free to slide in a bore in a convenient portion of the tractor body and loaded towards and to maintain contact with the finger by spring 76 contacting e.g. a flange 75a located towards the end of the said plunger.

Referring to FIGURES 1, 3 and 6 a cranked shaft 77 (FIGURE 3) passes through and is supported by a through-hole in the tractor body. A hand lever 78 exterior to the said tractor body is rigidly attached to this shaft which is endwise located in the tractor body by a pin 77a passing through the said shaft and contacting a washer 77b adjacent the inside face of the said tractor body. Freely supported on the cranked portion of the said shaft is a lever 79 inside the tractor body, this lever being retained on shaft 77 by some conventional means such as pins 77aa passing through the shaft and contacting washers 77ab one each on each side of said lever.

The hole 79a (FIGURE 6) in lever 79 through which shaft 77 passes is elongated and the lever is extended beyond this hole into a finger 80 for contact on the end of the plunger 75 being held in contact for example by a spring 81 the ends of which are hooked over suitable pins 81a one in the said finger extension and the other in a convenient portion of the tractor body. The other end of lever 79 is connected (FIGURE 6) by a pin 82 to the extension 42 of spool valve 41 and beyond this connection a finger 83 is provided for contact with stops 24a, 24b on valve body 24.

Referring to FIGURE 6 a shaft 91 passes through and is supported by the tractor body. Rigidly fixed to said shaft are a hand lever 92 outside the tractor body and a cam plate 93 inside the tractor body the cam plate being provided on its edge with a number of detents 93a for engagement with the rounded end of plunger 94 slidably located within a large bore 95a in a boss 95 which is positioned so that a smaller bore 95b extending from the large bore will pass to and freely enter the left hand of chamber 12. The junction of the large and small bores forms a valve seating upon which the conical end of a needle valve 96 is loaded by a spring 97 housed within the large bore and contacting the end of the plunger. A larger diameter portion of the needle valve forms a land 96a closely fitting but slidable within the large bore and beyond this land the needle valve is reduced in diameter to enable it to be freely supported in a throughbore 94a in plunger 94. This land 96a is positioned lengthwise of the large bore so that it covers the right hand edge of crossport 95c in boss 95 these crossports connecting the large bore with the interior of the tractor body.

The difference in area of the two large and small bores is deliberately introduced to provide an unloading device initially operated by a high blow-off pressure and thereafter maintained in this opened condition by continuous flow through the valve at a lower pressure as will be explained later.

Referring to FIGURE 1 two separate pumps 21, 44 are used each driven by suitable gear wheels 84, 85, 86 from a common and conventional power-take-off shaft 87 driven by the prime mover of the tractor but conveniently the functions of these two said pumps can be combined into one pump body for the purpose intended. Each said pump is provided with means such as pipes 88, 89 to receive fluid from a sump in the tractor body such fluid passing to the suction side of the said pumps.

On the outside of the tractor is a conventional quadrant 90 for limiting the movement of hand lever 78 in its extreme position to effect the operations of lifting or lowering and preselecting the depth of working of the implement.

An additional feature of this invention is the provision of many points at which fluid is returned to sump which thus enables supplies of lubricant to be directed to parts of the tractor mechanisms not necessarily related to the elements of this improved hydraulic system.

Having now described the construction of a practical embodiment of this invention we now explain the operations required to provide the following specific features:

(a) Transport of fully lifted position of the implement when the system is set for draft or automatic depth control.

(b) Draft or automatic depth control condition of working.

(c) Height or positive depth control condition of working.

When the implement is lifted to a position out of the ground as will be explained later a tension load is imposed by the overhung weight of the implement in upper link 3 and this naturally appertains when the implement is in the fully lifted position for transport purposes. Assuming the hydraulic system is set for draft or automatic depth control and for the moment the implement and draft linkage are weightless no load is imposed upon the said upper link in these lifted conditions, no pull is imparted to link 4 and no effect is transferred to the control valve or its mechanism.

The components of the control valve and its associated mechanisms are therefore disposed in the condition hereinafter referred to as the ideally neutral condition as shown in FIGURE 1 wherein ram 13 is centralised in relation to passages 15, 15 so that both these passages are slightly uncovered by the ram and the spool valve 41 covers crossport 39 at one end and the pressure or feed side of crossport 37 at the other end.

For transport purposes and as shown in FIGURES 1 and 6 sleeve 26 is held in a centrally balanced position endwise by spring 32 which equally loads flanged sleeve 31 against plate 36 and stop plate 33 against the inner face of end cover 34. In addition finger 80 is loaded by the pull of spring 81 against plunger 75 which by spring 76 is loaded against finger 73 contacting with the nose of cam 74 on cross-shaft 7, the anti-clockwise rotation of which during the last stages of the lifting operation has moved the finger 73 to the left to provide a gap between pads 70b, 72b. Also ram piston 10 is located toward the outer or open end of cylinder 11 to obtain the depicted position of lever 6 whereby the implement is lifted.

With this disposition of components of the hydraulic system, fluid from master pump 44 is allowed to bypass to the sump of the tractor body by way of pipe 45, passage 43, annulus 26b, passage 59 thence through the bobbin valve chamber 58a to passage 60, pipes 62, 63 and past the non-return valve ball 65 to bore 58b passage 67 and pipe 67a. At the same time fluid from the small pump 21 by way of the flow bisector 21a is being exhausted to said sump by way of pipes 19, 20, the end chambers of cylinder 12 and passages 15, 15, 16.

In practice the tension load in the said upper link causes piston 13 to move to the right to constrict the flow of liquid through the right hand port 15 automatically to create a pressure on that side of said piston sufficient to balance the said tension load. This pressure is transferred hydraulically to end chamber 28 whereupon sleeve 26 is forced toward the left so that the small crossport 39 passes the right hand edge of annulus 41b in spool valve 41 thus to allow a portion of the fluid in cylinder 11 loaded by the weight of the implement through piston 10 to escape to the sump in the tractor body by way of pipe 47, passage 46, annulus 26c, said crossport 39, annulus 41b, crossport 41aa and passage 41ab. At the same time stop plate 33 is pulled away from its contact with the inner face of end cover 34 and the load in spring 32 in increased. The release of this said portion of fluid from cylinder 11 results in the gradual lowering of the implement until sufficient rotation of the cam has allowed the finger 73 to move to the right thereby allowing the plunger 75 and finger 80 of lever 79 to move in the same direction. The said movement of finger 80 causes the bottom end of lever 79 to move to the left and pull the spool valve 41 in the same direction so to cover the small part 39 and prevent any further leakage of fluid from cylinder 11. Thus the implement is held in a slightly lower position from that for maximum lift and it will be appreciated that this resultant lower position will vary to a slight extent according to the shape of the cam and the overhung weight of the implement being transported.

Having explained the operation of the system for achieving a transport position for the implement when the said system is set for automatic depth control we now propose to explain the operations which enable the condition known as automatic depth control to be achieved.

When hand lever 69 is set for automatic depth control condition as shown in FIGURE 6, movement of hand lever 78 to the left causes spool valve 41 to move to the right until a position of the said hand lever is attained when the said spool valve uncovers crossport 39 to allow the fluid in cylinder 11 to escape to the sump in the tractor body as previously explained. So long as this position of the said hand lever is maintained the implement will lower until it touches the ground in which position the tension load in upper link 3 is removed thereby returning the piston 13 to its central position so to release the constriction of the fluid passing through the right hand end chamber of cylinder 12. This release of constriction relieves the pressure on the end chamber 28 to allow sleeve 26 to move to the right and in so doing again to cover small crossport 39 thereby to achieve the aforementioned ideally neutral condition.

The application of motion to the implement in the forward direction will not at this setting of hand lever 78 allow the implement to penetrate into the ground because any draft force imposed upon the implement by reason of its contact with the ground will create a compression load in upper link 3 to move ram 13 to the left and partially restrict the left hand port 15 so to cause the fluid flowing through the left hand end chamber of cylinder 12 to be pressurized to provide a sufficient pressure in end chamber 27 to move sleeve 26 to the right and uncover crossport 37 when fluid from the master pump will pass to cylinder 11 and thus tend to lift the implement.

Thus penetration of the implement into the ground can only be achieved by moving hand lever 78 still further to the left so to move spool valve 41 a relatively appreciable amount so that the small crossport 39 remains open until the draft force resulting from the predetermined required depth of working in the ground is achieved and sufficient compression load is then imparted to upper link 3 to cause the fluid passing through the left hand end chamber of cylinder 12 to rise in pressure sufficiently thereby to move sleeve 26 to the right and so allow the said small crossport 39 to be covered by said spool valve 41. Thus the disposition of components to obtain the previously defined ideally neutral condition is re-established but with spring 32 still further compressed and flanged sleeve 31 moved away from contact with plate 36 by an amount equal to the movement of sleeve 26.

In practice hand lever 78 is moved to the left to a predetermined position to suit the draft force required without hesitating at a position which only allows the implement to fall to the ground.

Thus any further movement of the hand lever to the left provides a predetermined setting for a corresponding position of the implement in the ground according to the amount of draft force required to be imposed on the implement in general terms of depth of working. For the shallowest depth of working hand lever 78 is moved a small amount to the left and for the deepest working said hand lever is moved to the left hand limit of the quadrant 90 of working between these two extremes being able to be provided by locating said hand lever at a suitable position in the said quadrant.

When hand lever 78 is moved to the extreme left hand limit of quadrant 90 the finger 83 at the lower end of lever 79 makes contact with stop 24a so to limit the right hand endwise movement of spool valve 41 the cranked portion of shaft 77 then being able to slide in slot 79a. Conversely when hand lever 78 is initially moved to the extreme right (lifted position) said finger 83 makes contact with stop 24a so to limit the movement of said spool valve to the left.

Should the draft force on the implement when working in the soil be increased such as is obtained when soil of greater resistance is encountered or for any reason the implement tends to work at an increased depth in the ground an increased compression load is imposed in upper link 3 to cause sufficient balance pressure to be created in the left hand end of cylinder 12 to move sleeve 26 to the right and thus uncover crossport 37. Thus the implement will be lifted to a position in the ground at which the draft force for the predetermined position of hand lever 78 is again achieved and the valve mechanism is automatically returned to the ideally neutral condition.

Conversely if the draft force on the implement is decreased such as is obtained when soil of lesser resistance is encountered or for any reason the implement tends to work at a shallower depth a relief of the compression force in upper link 3 is obtained. Thus the pressure of the fluid passing through end chamber 27 is decreased which allows sleeve 26 to move to the left and uncover crossport 39 to cause as before explained the implement to lower further into the ground to a depth of working which provides the required draft force on the implement to restore the system to the ideally neutral condition.

Thus is achieved control of draft force on the implement for any predetermined setting of the hand lever 78 to enable in effect and in practice the implement of work at a relatively constant depth in the ground.

However when implements with an excessive overhung weight are used it is possible for the upper link 3 to be at all time subjected to tension load. This results firstly in a relatively higher pressure on the fluid passing through the right hand end chamber of cylinder 12 than that obtained with a normal implement so that when the ideally neutral condition is obtained with the desired draft force on the implement the sleeve 26 is displaced a relatively appreciable amount to the left and a corresponding further deflection of spring 32 is obtained to provide a gap between stop plate 35 and the inner face of end cover 34.

Increase in draft force on such an implement results in a slight movement of ram 13 to the left which reduces the constriction and thereby the pressure on the fluid passing through the right hand end chamber of cylinder 12. This reduction of pressure has an effect on the system whereby sleeve 26 is moved to the right so that crossport 37 is uncovered to allow fluid to pass from the master pump to ram cylinder 11 as before explained so to cause the implement to be lifted the required amount to restore the draft force to the predetermined amount and raise the pressure in the right hand end chamber of cylinder 12 when sleeve 26 is then moved to the left and crossport 37 closed thus to re-establish the ideally neutral condition. Conversely when the draft force on the implement is decreased the tension load in the upper link 3 is increased so that a higher pressure is finally obtained in end chamber 28. This results in a movement of the sleeve 26 to the left to uncover small crossport 39 and this as before explained allows the implement to drop an amount in the ground sufficient for the intended draft force to be re-established when by reason of the decreased tension loading on the upper link 3 and the resultant slight movement of ram 13 to the left a reduced pressure is obtained in end chamber 28. Sleeve 26 therefore moves to the right and by covering the small crossport 39 re-introduces the ideally neutral condition.

Reverting to the action of lowering the implement from the lifted or transport position it is appreciated that as the cam 74 is rotated in a clockwise direction resulting from the lowering of the implement, finger 73 moves to the right to maintain contact with the nose of the said cam, said movement finally ceasing when pad 72b makes contact with pad 70b so that the said finger is then held in the position determined by said contact for all conditions of further lowering and working of the implement in the ground.

Reference has repeatedly been made in the foregoing explanations to the movement of sleeve 26 to the left or right and such movement must necessarily be limited to ensure that passages 43, 46 are not covered by the said sleeve at any time during its endwise movement. Such limits are obtained when stop plate 33 makes contact with the adjacent side of stop 35 for movement to the left and when the end of flanged sleeve 31 makes contact with the inner face of stop plate 33 for movement to the right.

From the foregoing it will be appreciated that regardless of the type and weight of implement used a lifting operation is promoted by a reduction of pressure in the right hand end chamber of cylinder 12 or by an increase of pressure in the left hand end chamber of said cylinder and conversely lowering of the implement is permitted when the pressure of the fluid passing through the said right hand end chamber is increased or when the pressure of the fluid passing through said left hand end chamber is reduced.

The foregoing explanation does not cover the condition known as height or positive depth control and it is now proposed to explain the operation of the hydraulic system for this said condition. With hand lever 69 set in the alternative position shown by dotted lines in FIGURE 1 spool valve 51 is moved downwards and locked in this position by the upper detent 53. Thus the gap between pads 72b, 70b is widened as shown in FIGURE 5, to an extent which will not allow said pads to make contact with each other at any time whatever the height position of the implement is in relation to the tractor.

The movement of spool valve 51 to its lower position prevents interchange of fluid between passages 22, 23 and passages 29, 30 but passages 29, 30 are now connected to the sump of the tractor body by way of the crossports 51ab, 51bb in spool valve 51 and the common passage 51c to the lower end of the spool valve chamber 50, passage 52 and pipe 52a. Thus, as is conventional practice, sleeve 26 is caused to remain located in one neutral position by spring 32 loading at one end flanged sleeve 31 against plate 36 and at the other end stop plate 33 against both the inner face of end cover 34 and spring ring 33a at the end of said sleeve extension. Said sleeve cannot therefore be subjected to any variations of load obtained by change in draft forces on the implement and the system alters to provide a more simple type of lift and drop hydraulic mechanism with means to provide an unaffected predetermined height position of the implement in relation to the tractor.

In this condition the fluid delivered by small pump 21 is always being bypassed to the sump of the tractor body by way of pipes 19, 20, passages 17, 18, the end chambers of cylinder 12 and passages 15, 15, 16 but the presence of this fluid at the ends of ram 13 provides a means by which upper link 3 is supported in both directions, i.e. with compression or tension loads applied.

Movement of the spool valve 41 is however not restricted by these changes and it can still freely respond to the movement of the linkage to which it is attached. A neutral condition is therefore achieved when the respective ends of the said spool valve cover the small crossport 39 and the pressure side of crossport 37 the extent of said cover in each case being a relatively small amount so as to provide quick operation of the system when the said spool valve is displaced from its neutral condition. Such a neutral condition is illustrated in FIGURE 6 if it is assumed that sleeve 26 is fixed in the position shown.

Thus assuming that the implement is in the fully raised position movement of hand lever 78 to the left a predetermined amount causes spool valve 41 to move to the right and uncover small crossport 39 to allow as before explained the implement to lower its position in relation to the tractor. As the implement is lowered cam 74 is rotated by shaft 7 in a clockwise direction and the nose of the said cam is gradually displaced so that plunger 75 and finger 73 are enabled to move to the right under the pressure exerted by spring 81 and thus maintain contact of said finger with the nose of the said cam. This movement of the said plunger enables spring 81 to pull finger 80 on lever 79 to the right so causing the said spool valve to be moved to the left until a position is reached when small crossport 39 is covered by the said spool valve and the implement in consequence is prevented from lowering beyond the height position so achieved.

It is therefore seen that the implement can be prevented from lowering beyond any height position as predetermined by the position of hand lever 78 in quadrant 90 whether or not it is working in the ground.

To lift the implement, hand lever 78 is moved to the right a sufficient amount to cause spool valve 41 to move to the left and uncover crossport 37 so that fluid can be delivered by the master pump to ram cylinder 11. As the implement lifts, cam 74 rotates in an anticlockwise direction and pushes finger 73, plunger 75 and finger 80 of lever 79 to the left thereby moving said spool valve to the right to again cover the pressure side of crossport 37 when lifting of the implement ceases. Thus a new height position of the implement can be achieved and continuous movement of hand lever 78 to the right will progressively determine a correspondingly limitless number of alternative height positions until maximum height, i.e. transport position is reached when, unlike when using automatic depth control, the implement is carried and remains at this maximum height position regardless of the weight of the implement.

The foregoing explanations cover the operations for achieving within the system the conditions with the implement in transport position when used with automatic depth control, when set for automatic depth control, and alternatively set for height or positive depth control incorporating transport position, but conveniently the described embodiment of this invention could incorporate means by which the system can provide, as is conventional practice, a source of hydraulic power for operation of other work producing mechanisms.

Other work producing mechanisms although varied usually take the form of single acting or double acting hydraulic ram or rams exterior to the tractor body for operation of equipment mounted on and/or coupled to the tractor.

It is not intended therefore to describe the method by which such rams are used to operate the said equipment is being sufficient to know that a separate control valve is usually attached to the tractor for the control of fluid to the rams from a pump source and from the rams to a sump or reservoir. Such a pump source could well be and in many cases is the pump incorporated in the tractor for operating the main work producing mechanism, i.e. implement lifting means and such a sump could conveniently be and usually is the sump in the tractor body. Also hydraulic connections to such a control valve could well be the two pipes 62, 63.

Usually such other work producing mechanisms are not required to be operable in conjunction with the implement lifting means and the system as drawn and described conforms to this condition. It is however possible to introduce means such as suitable and conventional control valves located externally to the tractor whereby all the work producing mechanisms can be operable at the same time or if desired in any sequence with one another for specific purposes.

For the normal condition when the implement lifting means is not being used, operation of an externally located control valve would allow fluid to be delivered from the master pump 44 by way of pipe 45, passage 43 to annulus 38 in sleeve 26 and thence by passage 59 to the lower end of bobbin valve chamber 58a, passage 60 and pipe 62 jointed to the said externally located control valve from a suitable port in which said fluid would then pass to a ram cylinder incorporated as part of another work producing mechanism. Suitable further operation of the said control valve would open a return port in the control valve to allow the fluid in the said ram cylinder to pass back to the sump in the tractor body by way of pipe 63, passage 64, non-return valve ball 65, bore 58b, passage 67 and pipe 67a.

As an example of sequence operation of other work producing mechanisms with the implement lifting means, provision could be made in the externally located control valve whereby after the other work producing mechanism has been operated it can be held in that position whilst the two pipes 62, 63 are enabled to be hydraulically jointed together by a suitable passage in the externally located control valve so to allow the implement lifting means to be independently operated as before described. To those skilled in the art, many other types of conventional externally located control valves could be used for different sequential operation of all or any combination of all work producing means.

The foregoing does not cover the operation of the overload release mechanism and it is now proposed to explain the functions of this feature.

When an implement is working in the soil it occasionally encounters obstructions such as tree roots or boulders which impart an impact to the implement which unless relieved could cause damage to the tractor or implement.

It is usual to provide some form of overload release and in systems incorporating hydraulic means for control of depth a simple form of pressure relief to the ram cylinder is mechanically arranged so that the tractor rear wheels are relieved of the weight of the implement and such other weight which may be imposed by the soil upon the implement so that the said wheels spin and cause the tractor to stop and impose a much reduced loading on the implement draft or attaching means.

Referring to FIGURES 1 and 6, such relief of weight on the tractor rear wheels is obtained by said impact load being converted into a compression load in the upper link 3 of such magnitude that the fluid passing through the left hand end of chamber 12 is instantaneously raised sufficiently immediately to lift the conical end of needle valve 96 off its seating and move land 96a across the crossport 95c thus to enable fluid to escape to the tractor sump and relieve all pressure from the left hand chamber.

The initial high pressure is hydraulically transferred to end chamber 27 and causes sleeve 26 to be quickly moved to the right to open crossport 37 and enable fluid to pass from the master pump 44 to the ram cylinder 11 in a manner before described thus to tend to lift the implement but this tendency is immediately counteracted by the said relief to pressure which causes the said end chamber 27 to be similarly relieved when said sleeve moves quickly to the left to uncover small crossport 39 and is held in this position so that a portion of the fluid in the ram cylinder is allowed to escape to the tractor sump in sufficient quantity to relieve the tractor rear wheels of the weight of the implement. Thus said tractor wheels are caused to spin the forward motion of the tractor is stopped and reduced draft force is now exerted upon the implement to produce a similarly reduced compression load in the upper link 3.

This said reduced compression load will cause the pressure of the fluid passing through the left hand end of chamber 12 to be reduced but such reduction of pressure will be insufficient to cause the conical end of needle valve to be reseated. Thus the overload condition of the system whereby the tractor wheels are caused to spin is, unlike other systems, maintained without further impacting the obstruction until the operator takes the necessary action to relieve the implement of the obstruction. This is able to be achieved by either depressing the main clutch, engaging reverse gear or if circumstances allow by causing the implement to be lifted when the valve is automatically reseated to seal the left hand of chamber 12.

The several detents 93a shown on the edge of cam plate 93 are used by successive engagement with plunger 94 by moving hand lever 92 to impose a progressively higher loading on spring 97 thus to produce alternative settings at which the overload release valve will react in the manner aforesaid. It will therefore be appreciated that the system can successfully cater for the limiting impact requirements of different types and weights of implements a light weight and more delicate implement naturally requiring lesser reaction from a load on the overload release valve than that required by a more robust implement designed for the heavier field operations.

We claim:

1. In a draft responsive mechanism for a tractor having a three-point hitch including two lower trailing draft links, a top link, lift means for lifting the draft links, and a lift mechanism including a source of hydraulic fluid under pressure, a hydraulic lift cylinder connected therewith and a sump: a control cylinder, a two-way piston within the control cylinder, means for mechanically transmitting draft sensing of both compression and tension from the top link to the piston to move it axially within the cylinder, fluid inlet passages extending to each end of the control cylinder, means for supplying fluid under pressure to the inlet passages, fluid outlet passages discharging to sump and extending from the control cylinder at each side of the piston when the piston is in a neutral position intermediate the ends of the control cylinder, and fluid-pressure-operated valve means interposed between the source of the hydraulic fluid under pressure and the lift cylinder, connected with said fluid inlet passages and operable by differential in pressure in the two inlet passages responsive to displacement of the piston in either direction from neutral position so as to close one of the outlet passages for either admitting fluid under pressure to the lift cylinder or permitting fluid to flow from said lift cylinder.

2. In a draft responsive mechanism for a tractor having a three-point hitch including two lower trailing draft links, a top link, lift means for lifting the draft links, and a lift mechanism including a source of hydraulic fluid under pressure, a hydraulic lift cylinder connected therewith and a sump: a control cylinder, a two-way piston within the control cylinder, means for mechanically transmitting draft sensing of both compression and tension from the top link to the piston to move it axially within the cylinder, fluid inlet passages extending to each end of the control cylinder, means for supplying fluid under pressure to the inlet passages, fluid outlet passages discharging to sump and extending from the control cylinder at each side of the piston when the piston is in a neutral position intermediate the ends of the control cylinder, a first valve member displaced by movement of the hydraulic lift mechanism, and a second cooperating valve member interposed between the source of the hydraulic fluid under pressure and the lift cylinder, connected with said fluid inlet passages and selectively actuated by differential in pressure in the two inlet passages responsive to displacement of the control cylinder piston in either direction from neutral position so as to close one of the outlet passages for either admitting fluid under pressure to the lift cylinder or permitting fluid to flow from said lift cylinder, displacement of the first valve member controlling the position at which the second valve member acts to admit fluid to or release fluid from the lift cylinder.

3. In a draft responsive mechanism for a tractor having a three-point hitch including two lower trailing draft links, a top link, lift means for lifting the draft links, and a lift mechanism including a source of hydraulic fluid under pressure, a hydraulic lift cylinder connected therewith and a sump: a control cylinder, a two-way piston within the control cylinder, means for mechanically transmitting draft sensing or both compression and tension from the top link to the piston to move it axially within the cylinder, fluid inlet passages extending to each end of the control cylinder, means for supplying fluid under pressure to the inlet passages, fluid outlet passages discharging to sump and extending from the control cylinder at each side of the piston when the piston is in a neutral position intermediate the ends of the control cylinder, a spool-type valve member displaced by movement of the hydraulic lift mechanism, and a cooperating sleeve-type valve member surrounding the spool-type valve member interposed between the source of the hydraulic fluid under pressure and the lift cylinder, connected with said fluid inlet passages and selectively actuated by differention in pressure in the two inlet passages responsive to displacement of the control cylinder piston in either direction from neural position so as to close one of the outlet passages for either admitting fluid under pressure to the lift cylinder or permitting fluid to flow from said lift cylinder, displacement of the spool-type valve member controlling the position at which the sleeve-type valve member acts to admit fluid or release fluid from the lift cylinder.

4. A draft responsive mechanism as claimed in claim 3, in which the sleeve type valve member is centered by a spring which is compressed by displacement of said sleeve type valve member in either direction.

5. A draft responsive mechanism as claimed in claim 4, in combination with an implement position control including means for actuating the spool type valve member responsive to change in implement height, and means for inactivating the movement of the sleeve type valve member responsive to position of the control cylinder piston.

References Cited in the file of this patent

UNITED STATES PATENTS

| | | |
|---|---|---|
| 2,394,210 | Sherman | Feb. 5, 1946 |
| 2,722,873 | Garmager | Nov. 8, 1955 |
| 2,750,862 | Garmager | June 19, 1956 |
| 2,786,402 | Senkowski et al. | Mar. 26, 1957 |

FOREIGN PATENTS

| | | |
|---|---|---|
| 1,144,281 | France | Apr. 23, 1957 |

UNITED STATES PATENT OFFICE
CERTIFICATE OF CORRECTION

Patent No. 3,002,571                                      October 3, 1961

Albert Henry Kersey et al.

It is hereby certified that error appears in the above numbered patent requiring correction and that the said Letters Patent should read as corrected below.

Column 13, lines 7 and 8, for "differention" read -- differential --; line 10, for "neural" read -- neutral --.

Signed and sealed this 6th day of March 1962.

(SEAL)
Attest:

ERNEST W. SWIDER
Attesting Officer

DAVID L. LADD
Commissioner of Patents